May 29, 1945. H. M. HUGE 2,377,152
POLYPHASE VOLTAGE REGULATOR
Filed July 3, 1944 2 Sheets-Sheet 1

INVENTOR.
HENRY M. HUGE
BY Woodling and Krost
ATTORNEYS.

INVENTOR.
HENRY M. HUGE

Patented May 29, 1945

2,377,152

UNITED STATES PATENT OFFICE 2,377,152

POLYPHASE VOLTAGE REGULATOR

Henry M. Huge, Lorain, Ohio, assignor of one-half to E. M. Heavens and one-half to Closman P. Stocker Application July 3, 1944, Serial No. 543,398

15 Claims. (Cl. 171—119)

This invention relates to magnetic voltage regulators and in particular to an arrangement for regulating the voltage of a polyphase source and for providing a substantially sinusoidal output voltage.

It is an object of this invention to use saturable inductance means to regulate the voltage of a polyphase alternating current source.

Another object of this invention is to reduce the harmonic content of the output voltage of a magnetic voltage regulator.

A further object of this invention is to increase the number of phases in the polyphase saturable reactor of my voltage regulator to minimize distortion of the regulated output voltage.

An additional object of this invention is to combine the elements of a polyphase regulator on a single core structure having a leakage flux path.

A still further object of this invention is to utilize common-core reactors in a polyphase voltage regulator to insure the provision of a balanced polyphase output voltage.

An additional object of this invention is to energize the parallel combination of a polyphase saturable reactor and a polyphase capacitor with a variable voltage and utilize the variations in the exciting current of the combination to produce a substantially constant output voltage.

Still another object of this invention is to supply the polyphase capacitor of my regulator with a substantially constant voltage to obtain improved regulation.

Other objects and a better understanding of this invention may be obtained by referring to the following specifications and claims in connection with the accompanying drawings.

Figure 1:
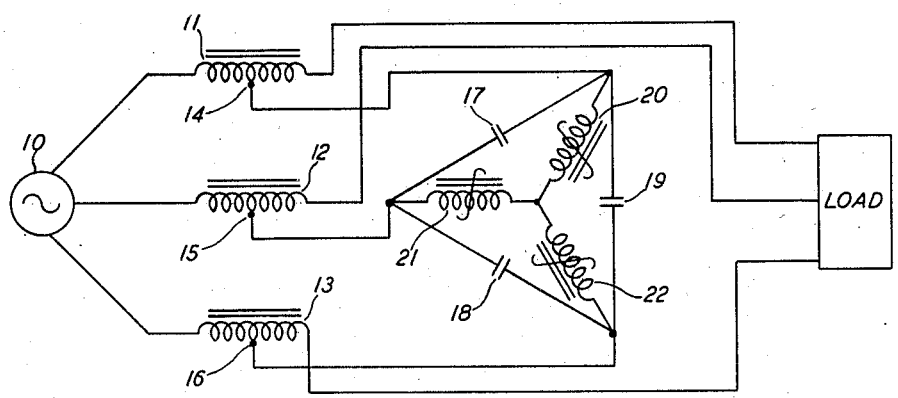
Figure 1 is the schematic diagram of a three-phase voltage regulator adapted to supply a load with regulated voltage having a reduced harmonic content.

With more particular reference to Figure 1, there is shown a star-connected group of three saturable inductances 20, 21 and 22 connected in parallel with the delta-connected capacitors 17, 18 and 19. This three-phase combination is energized from the three-phase source 10 through the three substantially linear inductances 11, 12 and 13. The taps 14, 15 and 16 divide the series inductance windings into two portions. The load is supplied substantially in parallel with the capacitors 17, 18 and 19 through one portion of the windings of the series inductances 11, 12 and 13.

The parallel combination of capacitors and saturable inductances presents a non-linear impedance to varying input voltage. For low input voltage, the saturable inductances operate at lower flux densities and consequently draw greatly diminished exciting current so that the parallel combination is capacitive. The capacitive current flowing through the series inductances 11, 12 and 13 produces a voltage rise which tends to stabilize the voltage across the parallel combination. When the input voltage increases, the magnetizing current of the saturable inductances increases rapidly and if the voltage is increased sufficiently, the parallel combination becomes inductive. The inductive current flowing through the series inductances produces a voltage drop which again tends to stabilize the voltage across the parallel combination. The load, being supplied substantially in parallel with the capacitors and saturable inductances, therefore receives stabilized voltage. If the load is supplied directly in parallel with the capacitors, however, the variations in the input voltage will produce slight variations in load voltage. These slight variations may be corrected by supplying the load with additional compensating voltage from the series inductances 11, 12 and 13 as shown in Figure 1. With this arrangement, it is possible to obtain almost any desired load voltage characteristic; that is, the output voltage may be caused to increase as the input voltage decreases, if desired. Furthermore, it is also possible to obtain substantially constant load voltage with variable load by this arrangement. The taps 14, 15 and 16 are located on the inductances 11, 12 and 13 in the position which provides the desired load voltage characteristic. Where precise regulation is not essential, the taps 14, 15 and 16 may be omitted and a load supplied directly in parallel with the capacitors 17, 18 and 19.

The arrangement shown in Figure 1 is capable of supplying the load with a voltage having a relatively small harmonic content. The third harmonic distortion which normally predominates in saturable magnetic voltage regulators is substantially eliminated with the arrangement shown. This is true because the third harmonic voltages generated by the saturable inductances 20, 21 and 22 are all in the same phase, and therefore the voltage across the capacitors, which is the difference between the voltages across two of the saturable inductances, contains substantially no third harmonic component. Furthermore, the delta-connected capacitors 17, 18 and 19 present a substantially shorted circuit for third harmonic voltages. This shorting path provides added assurance of third harmonic elimination, but is not essential when the source 10 supplies substantially sinusoidal voltage since there is substantially no tendency for the regulator to produce third harmonic distortion. The higher harmonics in the circuit are normally present in much smaller quantities, and in addition, the low impedance of the capacitors at these higher frequencies tends to minimize the higher harmonic voltages. Thus, I am able to supply the load in Figure 1 with a regulated voltage having a relatively small harmonic content.

It is advantageous to arrange the three series inductances 11, 12 and 13 on a common magnetic core to reduce the size of the regulator and also to aid in maintaining a balanced condition in the circuit. In this case the series element becomes a substantially linear three-phase inductance. The three saturable inductances 20, 21 and 22 may also be combined advantageously on a common magnetic core. With the regulator shown it is possible to supply an unbalanced load or even a single-phase load without seriously unbalancing the output voltages, and it is therefore possible to provide regulated single-phase output voltage from my voltage regulator.

Figure 2:
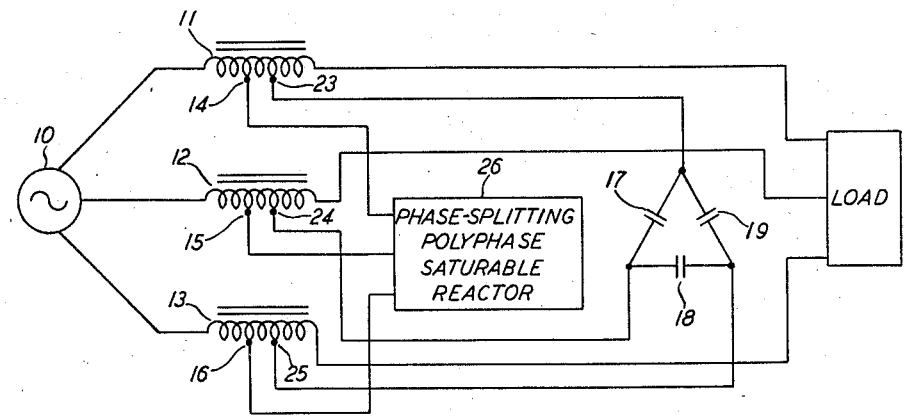
Figure 2 shows an arrangement for minimizing distortion of the load voltage and also for reducing the variations in the voltage supplied to the capacitors.

In Figure 2 the three saturable reactors 20, 21 and 22 of Figure 1 are replaced by a phase-splitting polyphase saturable reactor indicated merely by the box 26. The phase-splitting reactor 26 is not shown in detail because of the variety of circuit arrangements which may be adapted to this purpose. Furthermore, the various methods of splitting phases in order to obtain phase displacements or a larger number of phases are known in the art. The individual inductances making up the polyphase reactor 26 are each provided with a plurality of windings energized from different phases. Windings on different inductances are connected in series with each other in order to provide a total counter-electromotive force equal to and in phase with the applied voltage. By combining a plurality of inductances of this type it is possible to magnetize the polyphase reactor with an increased number of phases. I prefer to arrange the phase-splitting reactor to provide a substantially balanced polyphase magnetization.

By increasing the number of phases, the harmonic distortion in the wave-shape of the magnetizing current of the polyphase saturable reactor is greatly diminished. This effect can be explained in a simple manner by considering the peak magnitude of the magnetizing current in each phase as continuing over a short interval. This peak magnetizing current in a single phase reactor produces the marked harmonic distortion which appears in the output voltage of a regulator using a single phase saturable reactor. By utilizing a polyphase reactor, the peak magnetization pulses of the various reactors occur at different instants and in fact, overlap each other so that the distortion does not appear in the energizing current. With a phase-splitting reactor providing a balanced magnetization system having a large number of phases, the order of the lowest harmonic which will appear in the magnetizing current is greater than the number of phases in the reactor. For example, if the polyphase saturable reactor 26 is provided with windings producing a substantially balanced nine-phase magnetization, the magnitude of harmonics up to and including the ninth is negligible, and since the magnitude of harmonics of orders higher than the ninth is in general very small, the overall effect is to substantially eliminate all harmonic distortion. With this arrangement, the magnetizing current drawn through the series inductances 11, 12 and 13 in Figure 2 is substantially sinusoidal and the voltage produced across these series elements combined with the source of voltage results in an output voltage which is substantially sinusoidal.

The capacitors 17, 18 and 19 in Figure 2 are connected substantially in parallel with the polyphase saturable reactor 26 but are energized through compensating windings on the series inductances 11, 12 and 13 by means of the taps 23, 24 and 25. The compensating voltage supplied from the series inductances serves to reduce the variations in voltage across the capacitors 17, 18 and 19 and I am able to maintain a substantially constant capacitive current with this arrangement. The variable inductive current drawn by the phase-splitting reactor which is connected to the taps 14, 15 and 16 is therefore more effective in regulating the output voltage than with the arrangement of Figure 1. With the arrangement of Figure 1 the variation in voltage which is required by the saturable reactors in order to produce the required variations in magnetizing current is also applied to the capacitors and therefore results in slight variations in the capacitive current which tend to counteract the variations in the inductive magnetizing current of the saturable reactors. By maintaining a substantially constant capacitor voltage as may be done with the circuit of Figure 2, the counter variations in capacitive current may be substantially eliminated. In fact, it is possible to cause the voltage across the capacitors 17, 18 and 19 to increase as the voltage across the saturable reactor decreases. In this case it might be desirable to interchange the connections of the capacitors with the load connection in Figure 2 so that the load is supplied from the taps 23, 24 and 25, and the capacitors supplied from the ends of the windings 11, 12 and 13.

The regulating effect of the circuit of Figure 2 follows the same general principles as that of the circuit of Figure 1. When the input voltage rises, the increased inductive current drawn by the saturable reactor 26 passing through the series inductances 11, 12 and 13 produces an increased voltage drop stabilizing the voltage across the saturable reactor. The load, which is connected substantially in parallel with the saturable reactors, is supplied with the stabilized voltage and with additional compensating voltage from the series inductances 11, 12 and 13. As in the arrangement of Figure 1, the additional compensating voltage makes it possible to obtain increasing load voltage with decreasing input voltage if required, and to maintain a substantially constant load voltage with variable load.

Figure 3:
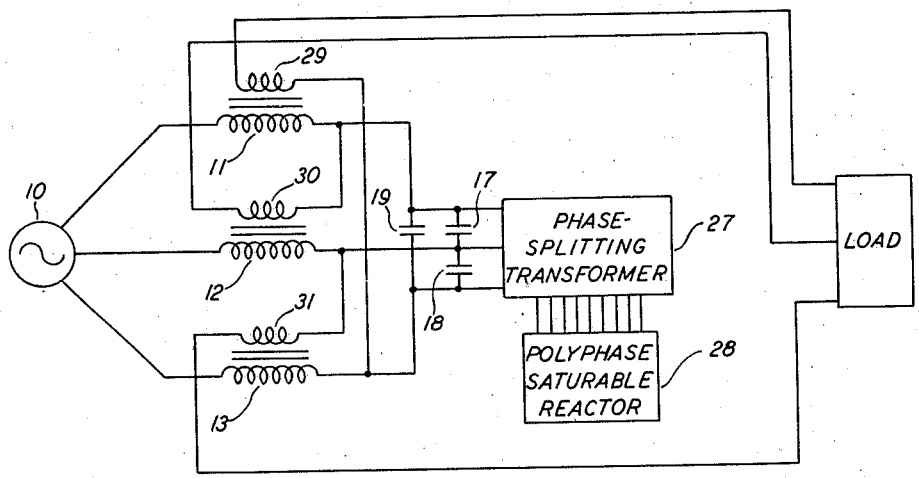
Figure 3 shows a regulator utilizing a phase-splitting transformer together with a polyphase saturable reactor instead of the phase-splitting reactor of Figure 2 and having a modified arrangement for obtaining compensating voltage in the output circuit.

The phase-splitting saturable reactor of Figure 2 which is effective in minimizing distortion of the wave form is replaced in Figure 3 by a substantially equivalent combination which consists of the phase-splitting transformer 27 feeding the polyphase saturable reactor 28 with an increased number of phases. Individual inductances of the polyphase saturable reactor may have single windings instead of the plurality of windings used in the arrangement of Figure 2. However, the phase-splitting windings are embodied in the transformer 27 so that the minimization of harmonic distortion is accomplished with the combination of Figure 3 as a result of the same factors which produce this effect in the phase-splitting reactor of Figure 2.

The capacitors 17, 18 and 19 in Figure 3 are connected directly across the input to the phase-splitting transformer 27, and this combination is energized from the three-phase source 10 through the series inductances 11, 12 and 13. The load is connected substantially in parallel with the capacitors and also supplied with compensating voltages from the compensating windings 29, 30 and 31 which are wound on the series inductances. The compensating voltages in Figure 3 are obtained from different phases than in the arrangements of Figures 1 and 2 so that the phase relationship between the compensating voltage and the load voltage is not the same as in the arrangements shown in the previous figures. However, it is possible to obtain a substantially constant output voltage with the circuit of Figure 3 and to obtain a substantially sinusoidal output voltage. The circuit arrangement of Figure 3 makes it possible to obtain a variation in the normal phase displacement between source and load voltages which occurs with the circuit of Figure 2. Thus, with the arrangement of Figure 3 or by a combination of the arrangements of Figures 2 and 3, I am able to control both the magnitude and phase of the load voltage.

Figure 4:
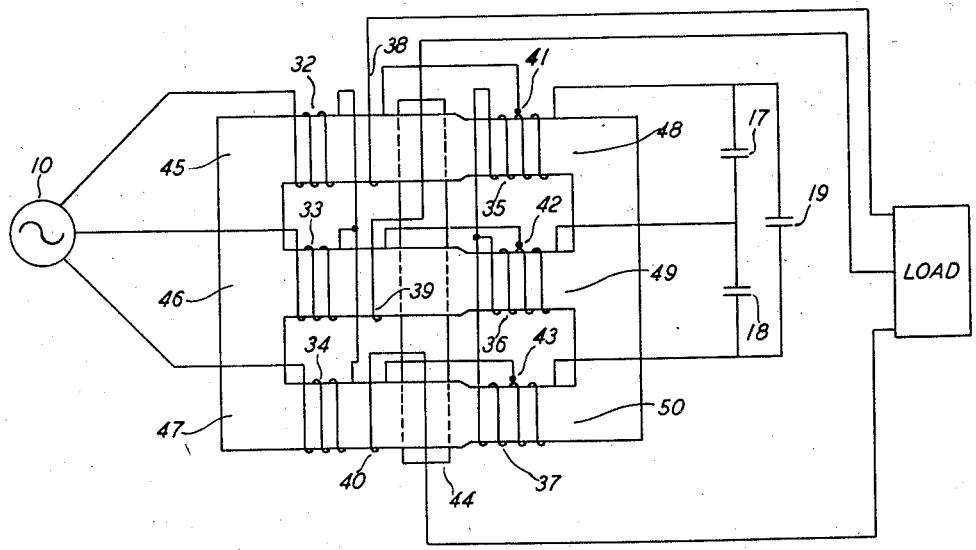
Figure 4 shows a common core construction for a three-phase voltage regulator made in accordance with my invention.

An advantageous arrangement for combining the saturable reactor and series reactors of Figure 1 on a common core having a leakage flux path is shown in Figure 4. The arrangement shown in Figure 4 also provides a load circuit which is insulated from the source 10.

The core structure in Figure 4 consists of three parallel core members 45, 46 and 47, having primary windings 32, 33 and 34 on their primary portions. These primary windings are energized from the source 10 and magnetize the entire core structure. The core members 45, 46 and 47 have secondary portions 48, 49 and 50 which are preferably made with a reduced cross-sectional area. The secondary windings 35, 36 and 37 on these secondary core portions are connected to the capacitors 17, 18 and 19. This combination receives its energy from the primary windings 32, 33 and 34 and the combined magnetization of the secondary core portions by the primary and secondary windings produces saturation of these core portions.

The transverse magnetic core member 44, which is situated between the primary and secondary core portions, serves as a path for leakage flux and produces a leakage reactance between the primary and secondary windings. This magnetic shunting member is preferably spaced away from the core members 45, 46 and 47 to provide suitable air gaps. These air gaps increase the reluctance of the leakage flux paths so that considerable magnetizing force may be applied to the secondary core portions. When the voltage of source 10 increases, the saturated core portions 48, 49 and 50 offer a high reluctance to any additional flux so that a large part of the additional flux is shunted through the leakage member 44. When the voltage from source 10 is below normal, the magnetizing current supplied by the capacitors 17, 18 and 19 maintains the high flux densities in the core portions 48, 49 and 50 and maintains a stabilized voltage across the secondary windings 35, 36 and 37.

The load is supplied with voltage from the secondary windings and from compensating windings 38, 39 and 40 which are wound on the primary portions of the core members 45, 46 and 47. The secondary windings are provided with taps 41, 42 and 43 in order to supply the load with the desired output voltage which may be less than the voltage supplied to the capacitors 17, 18 and 19. As explained in connection with Figure 1, stabilized load voltage can be obtained without the use of compensating windings, but the addition of a compensating voltage makes possible a much more accurate load voltage regulation and is therefore included in the preferred embodiment of my invention. The compensating windings in the circuit of Figure 4 are connected in opposition to the secondary windings, so that as the primary voltage increases, an increased voltage is subtracted from the secondary voltage. With this arrangement it is possible to obtain the desired regulating characteristics.

The harmonic content of the voltage supplied to the load in Figure 4 is substantially the same as to that supplied to the load in Figure 1. The core construction of Figure 4 has a tendency to suppress third harmonic flux, and in addition the symmetrical three-phase system tends to cancel third harmonic voltages so that the third harmonic distortion is substantially eliminated. The fifth harmonic distortion is not particularly serious because of the reduced magnitude of the fifth harmonic voltage and because of the low impedance of the capacitors to this frequency.

The core construction shown in Figure 4 is also applicable to the circuit arrangements shown in Figures 2 and 3. For this purpose, the phase-splitting polyphase saturable reactor of Figure 2, or the combined phase-splitting transformer and polyphase saturable reactor of Figure 3 are energized from the secondary windings 35, 36 and 37 in Figure 4. Since the saturable reactor with this arrangement is external to the core structure shown, it may be desirable to make the secondary core portions 48, 49 and 50 with substantially the same cross-sectional area as the primary core portions. In utilizing the arrangement of Figure 3 with this core construction, it is preferable to add additional secondary windings on the secondary core portions 48, 49 and 50. These additional windings are proportioned to correspond with the windings of the phase-splitting transformer 27 in Figure 3 and are used to split the secondary phases and to take the place of the phase-splitting transformer 27.

As in Figure 2, the capacitors in Figure 4 may be supplied with compensating voltage from additional compensating windings in order to maintain a substantially constant voltage across them. Furthermore, the compensating windings which are connected in series with the load may be in a different phase than the secondary windings to which they are connected, in order to reproduce the compensating arrangement shown in Figure 3.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A voltage regulator comprising in combination, polyphase saturable inductance means in parallel with polyphase capacitive means adapted to be energized from a polyphase alternating current source through series inductance means, and output circuit means adapted to supply a load substantially in parallel with the capacitive means.

2. A voltage regulator comprising in combination, polyphase saturable inductance means substantially in parallel with polyphase capacitive means adapted to be energized from a polyphase alternating current source through series inductance means having winding means thereon, and output circuit means adapted to connect a load substantially in parallel with said capacitive means, at least a portion of said winding means being serially connected between the load and the capacitive means.

3. A voltage regulator comprising in combination, polyphase saturable inductance means substantially in parallel with polyphase capacitive means adapted to be energized from a polyphase alternating current source through series inductance means having winding means thereon, and output circuit means adapted to connect a load substantially in parallel with said capacitive means, at least a portion of said winding means being serially connected between the capacitive means and the saturable inductance means.

4. A voltage regulator comprising in combination, polyphase saturable inductance means in parallel with polyphase capacitive means adapted to be energized from a polyphase alternating current source through series inductance means, and output circuit means adapted to supply a load substantially in parallel with the capacitive means, said polyphase saturable inductance means including phase-splitting winding means for providing magnetization thereof with an increased number of phases.

5. A voltage regulator comprising in combination, polyphase saturable inductance means substantially in parallel with polyphase capacitive means adapted to be energized from a polyphase alternating current source through series inductance means having winding means thereon, and output circuit means adapted to connect a load substantially in parallel with said capacitive means, at least a portion of said winding means being serially connected between the load and the capacitive means, said polyphase saturable inductance means including phase-splitting winding means for providing magnetization thereof with an increased number of phases.

6. A voltage regulator comprising in combination, polyphase saturable inductance means substantially in parallel with polyphase capacitive means adapted to be energized from a polyphase alternating current source through series inductance means having winding means thereon, and output circuit means adapted to connect a load substantially in parallel with said capacitive means, at least a portion of said winding means being serially connected between the capacitive means and the saturable inductance means, said polyphase saturable inductance means including phase-splitting winding means for providing magnetization thereof with an increased number of phases.

7. A voltage regulator comprising in combination, a phase-splitting transformer connected in parallel with polyphase capacitive means and adapted to be energized from a polyphase alternating current source through series inductance means, a polyphase saturable reactor adapted to be energized with an increased number of phases from the phase-splitting transformer, and output circuit means adapted to supply a load substantially in parallel with the capacitive means.

8. A voltage regulator comprising in combination, magnetic core means having a plurality of parallel magnetic flux paths, each flux path having a primary and a secondary portion, a plurality of primary windings, one on the primary portion of each flux path, adapted to be energized from a polyphase source of alternating current, a plurality of secondary windings, one on the secondary portion of each flux path, a plurality of capacitors connected to the secondary windings, leakage flux means providing a leakage reactance between the primary and secondary windings, the secondary portions of the flux paths being adapted to saturate under the combined magnetizing influences of the primary and secondary windings, and output circuit means adapted to supply a load from at least a portion of said secondary windings.

9. A voltage regulator comprising in combination, magnetic core means having a plurality of parallel magnetic flux paths, each flux path having a primary and a secondary portion, a plurality of primary windings, one on the primary portion of each flux path, adapted to be energized from a polyphase source of alternating current, a plurality of secondary windings, one on the secondary portion of each flux path, a plurality of capacitors connected to the secondary windings, leakage flux means providing a leakage reactance between the primary and secondary windings, the secondary portions of the flux paths being adapted to saturate under the combined magnetizing influences of the primary and secondary windings, compensating windings on the primary portions of the flux paths, and output circuit means adapted to supply a load with voltage from the secondary windings and from the compensating windings.

10. A voltage regulator comprising in combination, magnetic core means having a plurality of parallel magnetic flux paths, each flux path having a primary and a secondary portion, a plurality of primary windings, one on the primary portion of each flux path, adapted to be energized from a polyphase source of alternating current, a plurality of secondary windings, one on the secondary portion of each flux path, a plurality of capacitors connected to the secondary windings, leakage flux means providing a leakage reactance between the primary and secondary windings, phase splitting means for increasing the number of phases, and polyphase saturable inductance means magnetized with the increased number of phases, said saturable inductance means being adapted to be energized from the secondary windings, and output circuit means adapted to supply a load substantially in parallel with said capacitors.

11. A voltage regulator comprising in combination, star-connected saturable inductance means in parallel with polyphase capacitive means adapted to be energized from a polyphase alternating current source through series inductance means, and output circuit means adapted to supply a load substantially in parallel with the capacitive means.

12. A voltage regulator comprising in combination, magnetic core means having three parallel magnetic flux paths, each flux path having a primary and a secondary portion, three primary windings, one on the primary portion of each flux path, adapted to be energized from a three-phase source of alternating current, three secondary windings, one on the secondary portion of each flux path, a plurality of capacitors connected to the secondary windings, leakage flux means providing a leakage reactance between the primary and secondary windings, the secondary portions of the flux paths being adapted to saturate under the combined magnetizing influences of the primary and secondary windings, and output circuit means adapted to supply a load from at least a portion of said secondary windings.

13. A voltage regulator comprising in combination, magnetic core means having three parallel magnetic flux paths, each flux path having a primary and a secondary portion, three primary windings, one on the primary portion of each flux path, adapted to be energized from a three-phase source of alternating current, three secondary windings, one on the secondary portion of each flux path, a plurality of capacitors connected to the secondary windings, leakage flux means providing a leakage reactance between the primary and secondary windings, the secondary portions of the flux paths being adapted to saturate under the combined magnetizing influences of the primary and secondary windings, compensating windings on the primary portions of the flux paths, and output circuit means adapted to supply a load with voltage from the secondary windings and from the compensating windings.

14. A voltage regulator comprising in combination three saturable inductances, star-connected and connected substantially in parallel with three delta-connected capacitors adapted to be energized from a three-phase source of alternating current through three substantially linear series inductances, and an output circuit adapted to supply a load substantially in parallel with the capacitors.

15. A voltage regulator comprising in combination three saturable inductances, star-connected and connected substantially in parallel with three delta-connected capacitors adapted to be energized from a three-phase source of alternating current through a substantially linear three-phase series inductance, and an output circuit adapted to supply a load substantially in parallel with the capacitors.

HENRY M. HUGE.